United States Patent
Park et al.

(10) Patent No.: US 9,753,327 B2
(45) Date of Patent: Sep. 5, 2017

(54) LIQUID CRYSTAL DISPLAY DEVICE

(71) Applicant: Samsung Display Co., Ltd., Yongin-si (KR)

(72) Inventors: Haeil Park, Yongin-si (KR); Kisoo Park, Yongin-si (KR); Junghyun Kwon, Yongin-si (KR); Youngmin Kim, Yongin-si (KR); Kwangkeun Lee, Yongin-si (KR); Junhan Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 7 days.

(21) Appl. No.: 15/059,845

(22) Filed: Mar. 3, 2016

(65) Prior Publication Data

US 2016/0377920 A1 Dec. 29, 2016

(30) Foreign Application Priority Data

Jun. 23, 2015 (KR) .................. 10-2015-0089086

(51) Int. Cl.
*G02F 1/1335* (2006.01)

(52) U.S. Cl.
CPC .. *G02F 1/133617* (2013.01); *G02F 1/133528* (2013.01); *G02F 2001/133548* (2013.01); *G02F 2001/133614* (2013.01)

(58) Field of Classification Search
CPC ... G02F 1/133617; G02F 2001/133528; G02F 2001/133614; G02F 2001/133548; G02F 2001/136222; G02F 1/133514
See application file for complete search history.

(56) References Cited

U.S. PATENT DOCUMENTS

| | | | |
|---|---|---|---|
| 7,750,984 B2 | 7/2010 | Ha et al. | |
| 2001/0000436 A1* | 4/2001 | Nose | G02F 1/133603 349/65 |
| 2013/0242228 A1* | 9/2013 | Park | G02F 1/133617 349/61 |
| 2013/0271834 A1 | 10/2013 | Kim et al. | |
| 2013/0300986 A1 | 11/2013 | Kang | |
| 2015/0286095 A1* | 10/2015 | Wang | G02B 6/0068 349/42 |
| 2015/0331278 A1* | 11/2015 | Araki | G02F 1/133514 349/61 |

FOREIGN PATENT DOCUMENTS

| | | |
|---|---|---|
| JP | H11-52371 | 2/1999 |
| JP | H11-295717 | 10/1999 |
| JP | 2008-191287 | 8/2008 |
| KR | 10-2007-0039298 | 4/2007 |

\* cited by examiner

*Primary Examiner* — Nathanael R Briggs
(74) *Attorney, Agent, or Firm* — H.C. Park & Associates, PLC

(57) ABSTRACT

A display device includes: a first polarizer, a second polarizer, a liquid crystal layer, a color conversion member, an emission layer, and a first substrate. The second polarizer is disposed on the first polarizer. The liquid crystal layer is disposed between the first polarizer and the second polarizer. The color conversion member is disposed between the liquid crystal layer and the second polarizer. The emission layer is disposed on the second polarizer. The emission layer is configured to absorb at least a portion of light passed through the color conversion member and the second polarizer, and to emit light corresponding to at least a blue wavelength. The first substrate is disposed on the emission layer.

20 Claims, 6 Drawing Sheets

LIQUID CRYSTAL DISPLAY DEVICE

CROSS-REFERENCE TO RELATED APPLICATION

This application claims priority from and the benefit of Korean Patent Application No. 10-2015-0089086, filed on Jun. 23, 2015, which is incorporated by reference for all purposes as if fully set forth herein.

BACKGROUND

Field

Exemplary embodiments relate to display technology, and, more particularly, to a liquid crystal display device.

Discussion

Various electronic devices, such as mobile phones, personal digital assistants, computers, notebooks, tablets, televisions, etc., utilize flat panel display devices to display information and/or function as a user interface. Liquid crystal display (LCD) devices are a type of flat panel display with relatively low power consumption, relatively high quality moving picture display, and a relatively high contrast ratio. Conventional LCD devices typically include a liquid crystal (LC) layer disposed between two display panels, and are configured to apply an electric field to the LC layer to change the arrangement direction of LC molecules disposed in the LC layer. Changing the arrangement direction enables an LCD device to change the polarization direction of incident light and to display an image by associating the change with a polarizer and determining whether to transmit incident light on a pixel-by-pixel basis.

In a conventional LCD device, the brightness of light emitted in a lateral direction inclined at angle with respect to a normal direction is typically small in comparison to the brightness of light emitted in a direction normal to the display panels. These differences in brightness can cause a color coordinate of white light produced in the lateral direction to be shifted with respect to a color coordinate of white light produced in the normal direction.

The above information disclosed in this Background section is only for enhancement of understanding of the background of the inventive concept, and, therefore, it may contain information that does not form the prior art that is already known in this country to a person of ordinary skill in the art.

SUMMARY

One or more exemplary embodiments provide a liquid crystal display device configured to resolve viewing angle dependent brightness reductions and color shifts.

Additional aspects will be set forth in part in the description which follows and, in part, will be apparent from the disclosure, or may be learned by practice of the inventive concept.

According to one or more exemplary embodiments, a display device includes: a first polarizer, a second polarizer, a liquid crystal layer, a color conversion member, an emission layer, and a first substrate. The second polarizer is disposed on the first polarizer. The liquid crystal layer is disposed between the first polarizer and the second polarizer. The color conversion member is disposed between the liquid crystal layer and the second polarizer. The emission layer is disposed on the second polarizer. The emission layer is configured to absorb at least a portion of light passed through the color conversion member and the second polarizer, and to emit light corresponding to at least a blue wavelength. The first substrate is disposed on the emission layer.

According to one or more exemplary embodiments, a display device includes: a first polarizer, a second polarizer, a liquid crystal layer, a color conversion member, an emission layer, and a first substrate. The second polarizer is disposed on the first polarizer. The liquid crystal layer is disposed between the first polarizer and the second polarizer. The color conversion member is disposed between the liquid crystal layer and the second polarizer. The emission layer is disposed on the second polarizer. The emission layer is configured to absorb at least a portion of light passed through the color conversion member and the second polarizer, and to emit light of a wavelength different from a wavelength of the absorbed light. The first substrate is disposed on the emission layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
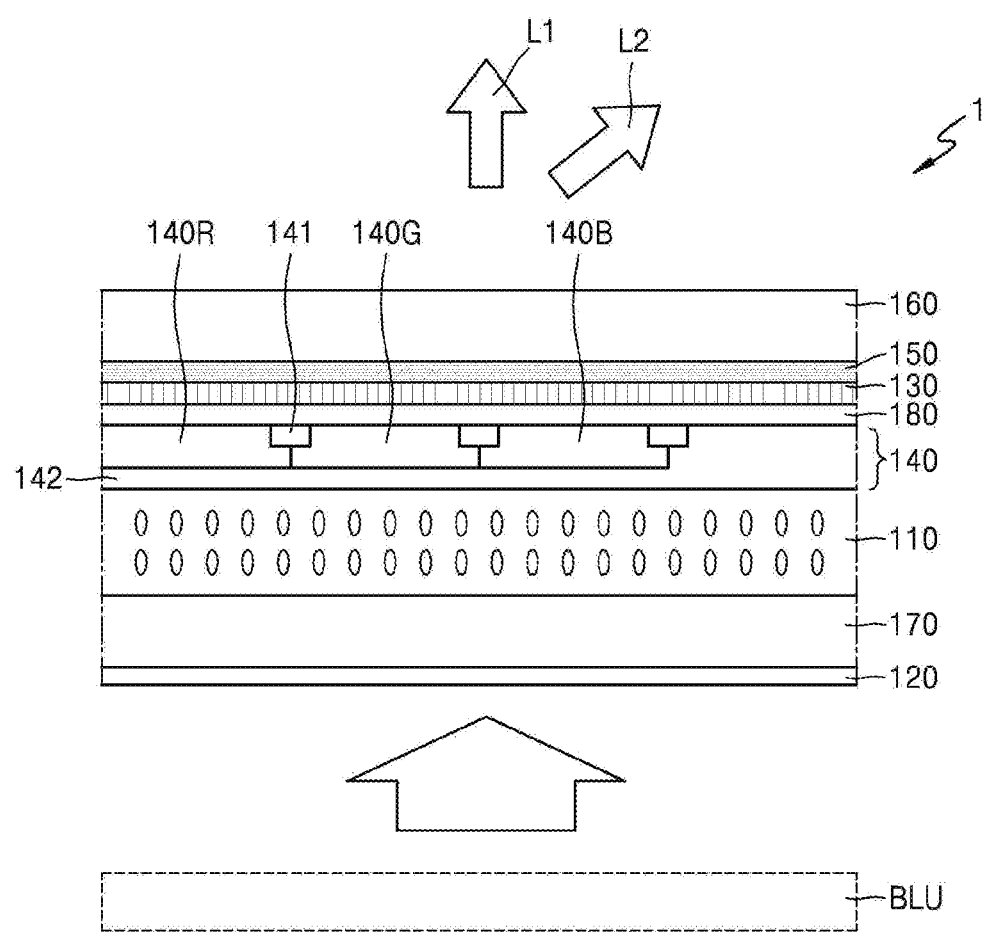
FIG. 1 is a schematic cross-sectional view of a liquid crystal display device, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
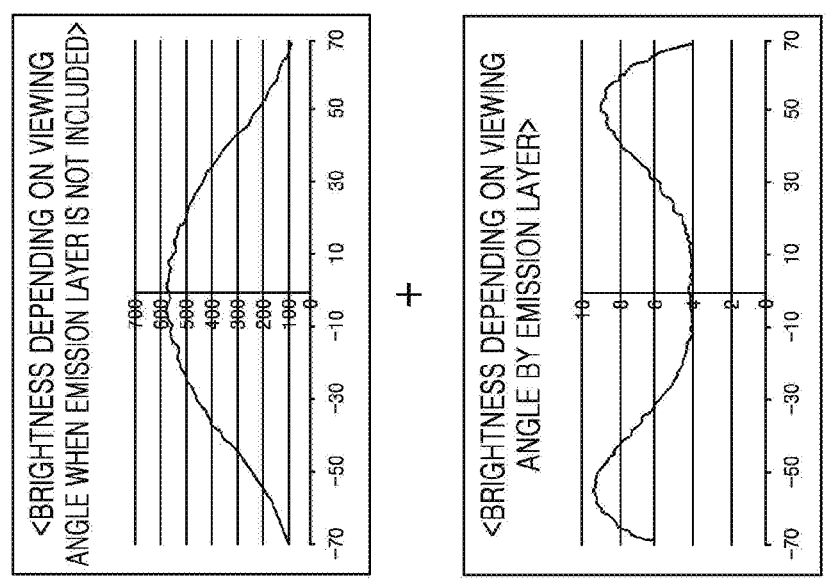
FIG. 2 provides graphs comparing brightness versus viewing angle of a liquid crystal display device, according to one or more exemplary embodiments.
Figure 3:
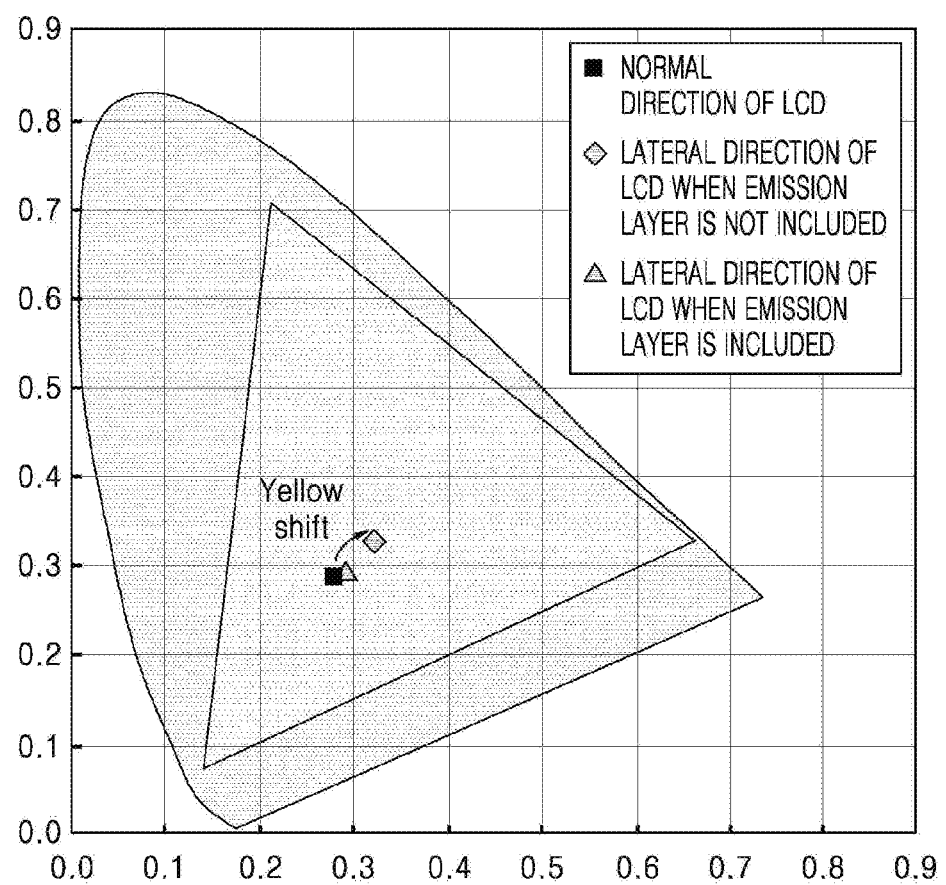
FIG. 3 is a graph comparing a color coordinate in a lateral direction with a color coordinate in a normal direction of a liquid crystal display device, according to one or more exemplary embodiments.

FIG. 1 is a schematic cross-sectional view of a liquid crystal display device, according to one or more exemplary embodiments. FIG. 2 provides graphs comparing brightness versus viewing angle of a liquid crystal display device, according to one or more exemplary embodiments. FIG. 3 is a graph comparing a color coordinate in a lateral direction with a color coordinate in a normal direction of a liquid crystal display device, according to one or more exemplary embodiments.

Referring to FIG. 1, an LCD device 1 includes a first polarizer 120, a second polarizer 130 spaced apart from the first polarizer 120, an LC layer 110 disposed between the first and second polarizers 120 and 130, a color conversion member 140 disposed between the LC layer 110 and the second polarizer 130, and an emission layer 150 disposed on the second polarizer 130. The emission layer 150 may be configured to absorb at least a portion of light that passes through the color conversion member 140 and the second polarizer 130, as well as configured to emit light of a wavelength different from a wavelength of the absorbed light. The LCD device 1 may also include an upper substrate 160 disposed on the emission layer 150.

The LCD device 1 produces an image using a principle in which external light illuminated from a backlight unit BLU, etc., is incident on the first polarizer 120 and is polarized in a specific direction, and then is incident on the LC layer 110. The light propagating through the LC layer 110 has its polarization direction controlled by the LC layer 110, and light that passes through a portion of the LC layer 110 that corresponds to at least some pixels reaches a user by passing through the second polarizer 130. The backlight unit BLU may emit white light, and may be disposed below the first polarizer 120 and, thereby, configured to provide light to the first polarizer 120.

The color conversion member 140 may be disposed between the LC layer 110 and the second polarizer 130, and may convert light incident on the color conversion member 140 into light of a predetermined color. According to one or more exemplary embodiments, the color conversion member 140 may include a red pixel region, a green pixel region, a blue pixel region, and a white pixel region.

The red pixel region, the green pixel region, and the blue pixel region may be associated with a red color filter 140R, a green color filter 140G, and a blue color filter 140B, respectively. The color conversion member 140 may further include an overcoat layer 142 that covers the red color filter 140R, the green color filter 140G, and the blue color filter 140B. The overcoat layer 142 may extend to the white pixel region where no color filter is disposed, as well as disposed in the red pixel region, the green pixel region, and the blue pixel region. That is, only the overcoat layer 142 is disposed in the white pixel region, and light that passes through the LC layer 110 may directly pass through the white pixel region of the color conversion member 140 without color conversion. The white pixel region may enable the brightness of the LCD device 1 to be improved. A black matrix 141 for preventing color mixing may be disposed between the respective pixel regions.

Although not shown, at least two electrodes, to which different voltages are applied, respectively, may be disposed above and/or below the LC layer 110 in order to apply an electric field to the LC layer 110. The application of the voltages may be controlled by a switching device (not shown), such as a thin film transistor. Also, one or more alignment layers (not shown) that determine an arrangement state (e.g., pretilt) of the LC layer 110 when an electric field is not applied to the LC layer 110 may be disposed above and/or below the LC layer 110. The shapes and locations of the electrodes and the alignment direction of the alignment layer(s) may be variously implemented depending on a mode of the LCD device 1.

According to one or more exemplary embodiments, the LCD device 1 may include the second polarizer 130 disposed on the color conversion member 140. The second polarizer 130 may be a wire grid polarizer (WGP). The WGP 130 may include a regular array of fine metallic wires disposed in parallel with one another. Since the WGP may perform the same function as a general polarizer, but may be formed by disposing metallic wires with an interval equal to or less than the wavelength of incident light without orienting a material forming the polarizer, the WGP may have an advantage that the WGP may be easily formed on the inner surface of the LCD device 1.

The polarization axis of the first polarizer 120 and the polarization axis of the second polarizer 130 may be perpendicular to each other. When an electric field is applied to the
LC layer 110 and the polarization direction of light that passes through the first polarizer 120 is rotated by 90 degrees by the LC layer 110 serving as a phase retarder, the light may pass through the second polarizer 130 and may be emitted to the outside.

Although not illustrated, the LCD device 1 may include a plurality of pixels, which may be configured to produce an image by applying an electric field to one or more portions that respectively correspond to the red pixel region, the green pixel region, and the blue pixel region of the LC layer 110 and allowing light of a determined color to be emitted through a pixel. When an electric field is applied to the entire LC layer 110 of the LCD device 1, white light may be produced by a combination of red light, green light, and blue light, and white light that passes through the white pixel region is further added to the output so that white light of high brightness may be emitted.

Referring to the graph on the upper left portion of FIG. 2, the brightness of light L2 emitted in a lateral direction inclined by a determined angle with respect to a normal direction may be small compared with the brightness of light L1 emitted in the normal direction of the LCD device 1 when emission layer 150 is not present. A reduction degree of the brightness may increase when the angle increases. That is, when a viewing angle increases, the brightness may decrease.

Also, referring to FIG. 3, white light has been set based on light L1 emitted in the normal direction of the LCD device 1 without the emission layer 150. Light L2 emitted in a lateral direction inclined by a determined angle with respect to the normal direction may have a color coordinate different from the white light produced in the normal direction. For example, the light L2 emitted in the lateral direction may be yellowish white light. That is, when a user views the LCD device 1 in the normal direction, intended white light may be recognized, but when the user views the LCD device 1 in the lateral direction, yellowish white light may be recognized. This is referred to as a color shift depending on a viewing angle, and this may occur because the recognized arrangement direction of the LC layer 110 is different depending on the progression direction and the length of light paths of light that passes through the LC layer 110 in the normal direction and light that passes through the LC layer 110 in the lateral direction.

The LCD device 1, according to one or more exemplary embodiments, may include the emission layer 150 disposed on the second polarizer 130. The emission layer 150 may include a thin film in order to transmit most, e.g., about 80% or more, of light that passes through the color conversion member 140 and the second polarizer 130. For example, the emission layer 150 may have a thickness of about 0.5 µm or less. In this manner, the emission layer 150 may absorb at least a portion of light that passes through the color conversion member 140 and the second polarizer 130, and emit light of a wavelength different from that of the absorbed light. According to one or more exemplary embodiments, the emission layer 150 may emit at least blue light. The blue light may have a wavelength of about 450 nm to about 495 nm among wavelengths of visible light.

The emission layer 150 may include a quantum dot or a fluorescent substance. Light that passes through the color conversion member 140 has a color, such as a red color, a green color, and a blue color, and a beam profile representing light intensity depending on a wavelength of a determined width. For example, the beam profile may have a Gaussian shape. That is, light that passes through the color conversion member 140 may have a largest intensity at a wavelength corresponding to red light, green light, or blue light, but may also include light of a different wavelength. Light of a wavelength shorter than that of blue light is absorbed by the emission layer 150, and the emission layer 150 may emit the blue light. For example, regarding a quantum dot, the wavelength of absorbed and emitted light may change depending on the size of the quantum dot, and blue light may be emitted by controlling the size of the quantum dot and absorbing light of a wavelength shorter than that of the blue light.

The emission layer 150 may further include at least one of blue pigment, dye, and a scatterer in addition to a material that emits light, such as a quantum dot or a fluorescent substance. The addition of at least one of the blue pigment, the dye, and the scatterer may increase the brightness of emitted blue light through these materials.

Taking into account a light path, the emission layer 150 may be disposed above the second polarizer 130. That is, light that passes through the LC layer 110 may be allowed to pass through the second polarizer 130 and then pass through the emission layer 150. When light passes through the emission layer 150 prior to the second polarizer 130, the polarization direction of the light changes and a portion of the light that should pass through the second polarizer 130 may not pass through the second polarizer 130 or a portion of the light that should not pass through the second polarizer 130 may pass through the second polarizer 130. As such, a desired image may not be produced.

Referring to a graph on the lower left portion of FIG. 2, light emitted from the emission layer 150 has a beam profile of a donut (or toroid) shape, and beam intensity has a maximum value at a lateral direction inclined by an angle of about 55 degrees with respect to the normal direction, i.e., normal to a surface of upper and lower substrates 160 and 120. This beam profile is obtained because a light path in which light passes the emission layer 150 in the lateral direction inclined with respect to the normal direction is longer than a light path in which light passes the emission layer 150 in the normal direction. A difference in the beam intensity may increase when the emission layer 150 is relatively thin. That is, quantum dots or fluorescent substances included in the emission layer 150 may be distributed at substantially uniform density in the emission layer 150, and, as such, light emission may occur much more when the length of a path that passes through the emission layer 150 increases.

At least a portion of the emission layer 150 may satisfy the following Condition 1:

when $d_2 > d_1$, then $I_2 > I_1$     Condition 1

According to one or more exemplary embodiments, $d_1$ and $d_2$ represent lengths of light paths that pass through the emission layer 150, and $I_2$ and $I_1$ represent intensities of light that passes through the paths corresponding to the lengths of $d_2$ and $d_1$, respectively, and is emitted from the emission layer 150 to the outside. It is noted that $d_1$ and $d_2$ may be lengths of paths that are substantially straight lines. For instance, $d_1$ may represent a path to emit light in a normal direction and $d_2$ may be a path to emit light in a lateral direction.

Condition 1 means that intensity of light that is absorbed by the emission layer 150 while passing through the emission layer 150 in a normal direction and emitted from the emission layer 150 may be less than the intensity of light that is absorbed by the emission layer 150 while passing through the emission layer 150 in a lateral direction and emitted from the emission layer 150. Condition 1 is applicable when an angle inclined with respect to the normal direction is in a range greater than 0 degrees and less than about 55 degrees. In a range greater than about 55 degrees, a path that passes through the emission layer 150 is excessively lengthened, and, as such, the intensity of light emitted from the emission layer 150 may be reduced.

The graph on the right side of FIG. 2 is a combination of the graph on the upper left portion of FIG. 2, which is a beam profile of light that passes through the color conversion member 140, and the graph on the left lower portion of FIG. 2, which is a beam profile of light emitted from the emission layer 150. The graph on the right side of FIG. 2 reveals that the LCD device 1 resolves brightness being reduced depending on a viewing angle.

Referring to FIG. 3, the graph shows that yellowish white light emitted in the lateral direction when the emission layer 150 is not included has improved to white light of almost the same color coordinate as that of white light emitted in the normal direction when the emission layer 150 that emits at least blue light is included.

Adverting back to FIG. 1, the upper substrate 160 that protects the emission layer 150 may be disposed on the emission layer 150, and a planarization layer 180 for planarizing the second polarizer 130 may be further disposed between the color conversion member 140 and the second polarizer 130. According to one or more exemplary embodiments, a lower substrate 170 facing the upper substrate 160 may be disposed below the LC layer 110, and the first polarizer 120 may be disposed below the lower substrate 170, that is, the outer surface of the lower substrate 170. The lower substrate 170 may include a driving device (not shown), such as a thin film transistor and a capacitor, and wirings (not shown), etc.

Figure 4:
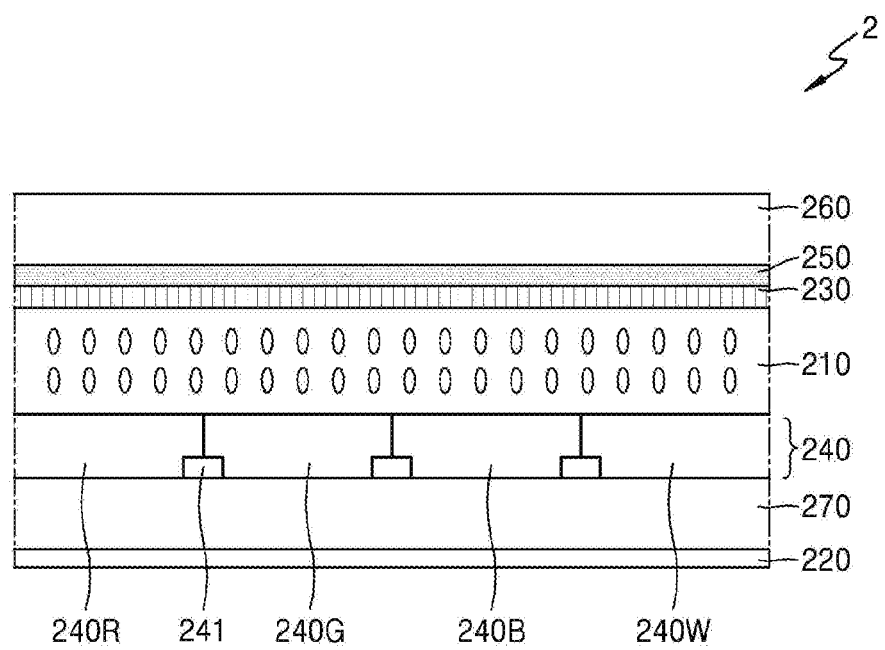
FIG. 4 is a schematic cross-sectional view of a liquid crystal display device, according to one or more exemplary embodiments.

FIG. 4 is a schematic cross-sectional view of a liquid crystal display device, according to one or more exemplary embodiments.

Referring to FIG. 4, the LCD device 2 includes an LC layer 210, a first polarizer 220 and a second polarizer 230 spaced apart from each other with the LC layer 210 disposed therebetween, a color conversion member 240 disposed between the first polarizer 220 and the LC layer 210, a thin film emission layer 250 disposed on the second polarizer 230 to absorb at least a portion of light that passes through the color conversion member 240 and the second polarizer 230 and to emit light of a wavelength different from that of the absorbed light, and an upper substrate 260 disposed on the emission layer 250.

The backlight unit BLU (see FIG. 1) that emits white light may be disposed below the first polarizer 220, and light illuminated from the backlight unit BLU may be incident on the first polarizer 220. A lower substrate 270 may be disposed on the first polarizer 220, and the color conversion member 240 may be disposed on the lower substrate 270. The color conversion member 240 may convert white light incident on the color conversion member 240 into light of a determined color. According to one or more exemplary embodiments, the color conversion member 240 may include a red pixel region, a green pixel region, a blue pixel region, and a white pixel region.

The red pixel region, the green pixel region, the blue pixel region, and the white pixel region may include a red color filter 240R, a green color filter 240G, a blue color filter 240B, and a white color filter 240W, respectively. The red color filter 240R, the green color filter 240G, and the blue color filter 240B may include materials in which red, green, and blue pigment or dye are added to transparent resins, respectively. The white color filter 240W may include a material in which a light scatterer, etc., are added to a transparent resin. The LCD device 2 may include the white pixel region so that the brightness of the LCD device 2 may improve due to the white pixel region. A black matrix 241 for preventing (or at least reducing) color mixing may be disposed between the respective pixel regions.

Although not shown, at least two electrodes to which different voltages may be applied, respectively, may be disposed above and/or below the LC layer 210 in order to apply an electric field to the LC layer 210. The application of the voltages may be controlled by a switching device (not shown), such as a thin film transistor. Also, an alignment layer (not shown) that determines an arrangement state (e.g., pretilt) of the LC layer 210 when an electric field is not applied to the LC layer 210 may be disposed above and/or below the LC layer 210.

As seen in FIG. 4, the LCD device 2 may include the second polarizer 230 disposed on the LC layer 210, and the second polarizer 230 may be a WGP. It is contemplated, however, that exemplary embodiments are not limited thereto. The second polarizer 230 may be a general sheet-shaped polarizer. Further, the LCD device 2 may include the emission layer 250 disposed on the second polarizer 230, and the upper substrate 260 disposed on the emission layer 250. The emission layer 250 may include a thin film to transmit most, e.g., about 80% or more, of light that passes through the color conversion member 240, the LC layer 210, and the second polarizer 230. The emission layer 250 may have a thickness of about 0.5 µm or less.

The emission layer 250 may absorb at least a portion of light that passes through the color conversion member 240 and the second polarizer 230, and emit light of a wavelength different from that of the absorbed light. According to one or more exemplary embodiments, the emission layer 250 may emit at least blue light. The emission layer 250 may include a quantum dot or a fluorescent substance. The emission layer 250 may further include at least one of blue pigment, dye, and a scatterer in addition to a material that emits light, such as the quantum dot or the fluorescent substance. In this manner, the addition of at least one of the blue pigment, the dye, and the scatterer may increase the brightness of emitted blue light.

Taking into account a light path, the emission layer 250 may be disposed above the second polarizer 230. That is, light that passes through the LC layer 210 may be allowed to pass through the second polarizer 230 and then pass through the emission layer 250. When light passes through the emission layer 250 prior to the second polarizer 230, the polarization direction of the light changes and a portion of the light that should pass through the second polarizer 230 may not pass through the second polarizer 230, or a portion of the light that should not pass through the second polarizer 230 may pass through the second polarizer 230. In this manner, a desired image may not be produced.

At least a portion of the emission layer 250 may satisfy the following Condition 2:

$$\text{when } d_2 > d_1, \text{ then } I_2 > I_1 \qquad \text{Condition 2}$$

According to one or more exemplary embodiments, $d_1$ and $d_2$ represent lengths of light paths that pass through the emission layer 150, and $I_2$ and $I_1$ represent intensities of light that passes through the paths corresponding to the lengths of $d_2$ and $d_1$, respectively, and is emitted from the emission layer 150 to the outside. It is noted that $d_1$ and $d_2$ may be lengths of paths that are substantially straight lines. For instance, $d_1$ may represent a path to emit light in a normal direction and $d_2$ may be a path to emit light in a lateral direction.

Condition 2 means that the intensity of light that is absorbed by the emission layer 250 while passing through the emission layer 250 in a normal direction and emitted from the emission layer 250 may be less than the intensity of light that is absorbed by the emission layer 250 while passing through the emission layer 250 in a lateral direction and emitted from the emission layer 250. Condition 2 is applicable when an angle inclined with respect to the normal direction is in a range greater than 0 degrees and less than about 55 degrees. In a range greater than about 55 degrees, a path that passes through the emission layer 250 is excessively lengthened, and, as such, the intensity of light emitted from the emission layer 250 may be reduced.

As seen in FIG. 4, the LCD device 2 may include the emission layer 250 disposed between the second polarizer 230 and the upper substrate 260, and, as described with reference to FIGS. 1 to 3, may resolve brightness reduction and a color shift that depends on a viewing angle of the LCD device 2 by using the emission layer 250. The lower substrate 270 included in the LCD device 2 may include driving devices (not shown), such as a thin film transistor and a capacitor, and wirings (not shown), etc. The color conversion member 240 may be disposed on the lower substrate 270, not the upper substrate 260, so that the color conversion member 240 including the driving devices (not shown), the wirings (not shown), the black matrix 241, etc. may be more easily aligned with one another.

Figure 5:
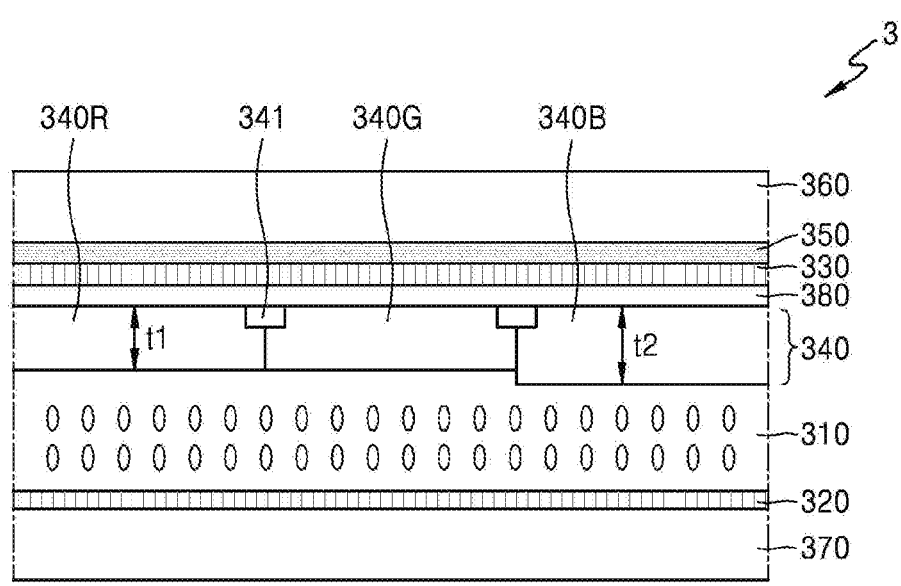
FIG. 5 is a schematic cross-sectional view of a liquid crystal display device, according to one or more exemplary embodiments.

FIG. 5 is a schematic cross-sectional view of a liquid crystal display device, according to one or more exemplary embodiments.

Referring to FIG. 5, the LCD device 3 includes an LC layer 310, a first polarizer 320 and a second polarizer 330 spaced apart from each other with the LC layer 310 disposed therebetween, a color conversion member 340 disposed between the LC layer 310 and the second polarizer 330, an emission layer 350 disposed on the second polarizer 330 to absorb at least a portion of light that passes through the color conversion member 340 and the second polarizer 330 and to emit light of a wavelength different from that of the absorbed light, and an upper substrate 360 disposed on the emission layer 350.

According to one or more exemplary embodiments, the color conversion member 340 is disposed between the LC layer 310 and the second polarizer 330, and the color conversion member 340 may convert light incident on the color conversion member 340 into light of a determined color. To this end, the color conversion member 340 may include a red pixel region, a green pixel region, and a blue pixel region.

The red pixel region, the green pixel region, and the blue pixel region may include a red color filter 340R, a green color filter 340G, and a blue color filter 340B, respectively. The thickness $t_2$ of the blue color filter 340B may be greater than the thickness $t_1$ of the red color filter 340R and the green color filter 340G. According to one or more exemplary embodiments, the LCD device 3 may not include a white pixel region for improving brightness. The LCD device 3 may reduce even more of a color shift that depends on a viewing angle by reducing a color shift that may increase due to the white pixel region. Additionally, making the thickness $t_2$ of the blue color filter 340B larger than the thicknesses of the other color filters 340R and 340G, and, thereby, making the thickness of a portion of the LC layer 310 that corresponds to the blue pixel region relatively thin enables the LCD device 3 to improve brightness and reduce a color shift that depends on a viewing angle. A black matrix 341 for preventing (or at least reducing) color mixing may be disposed between the respective pixel regions.

The LCD device 3 may include the second polarizer 330 disposed on the color conversion member 340, and the second polarizer 330 may be a WGP. A planarization layer 380 may be disposed between the color conversion member 340 and the second polarizer 330. The LCD device 3 may include the emission layer 350 disposed on the second polarizer 330. The emission layer 350 may include a thin film in order to transmit most, e.g., about 80% or more, of light that passes through the color conversion member 340 and the second polarizer 330. For example, the emission layer 350 may have a thickness of about 0.5 µm or less. To this end, the emission layer 350 may absorb at least a portion of light that passes through the color conversion member 340 and the second polarizer 330, and emit light of a wavelength different from that of the absorbed light. According to one or more exemplary embodiments, the emission layer 350 may emit at least blue light.

The emission layer 350 may include a quantum dot or a fluorescent substance. The emission layer 350 may further include at least one of blue pigment, dye and a scatterer in addition to a material that emits light, such as the quantum dot or the fluorescent substance. In this manner, the addition of the blue pigment, the dye, and the scatterer may increase the brightness of emitted blue light.

As seen in FIG. 5, a lower substrate 370 facing the upper substrate 360 may be disposed below the LC layer 310. The first polarizer 320 may be disposed between the lower substrate 370 and the LC layer 310. The first polarizer 320 may be a WGP. The other components and associated configurations of the LCD device 3 of FIG. 5 that are not described herein may be the same as those described in association with the LCD device 1 of FIG. 1.

Figure 6:
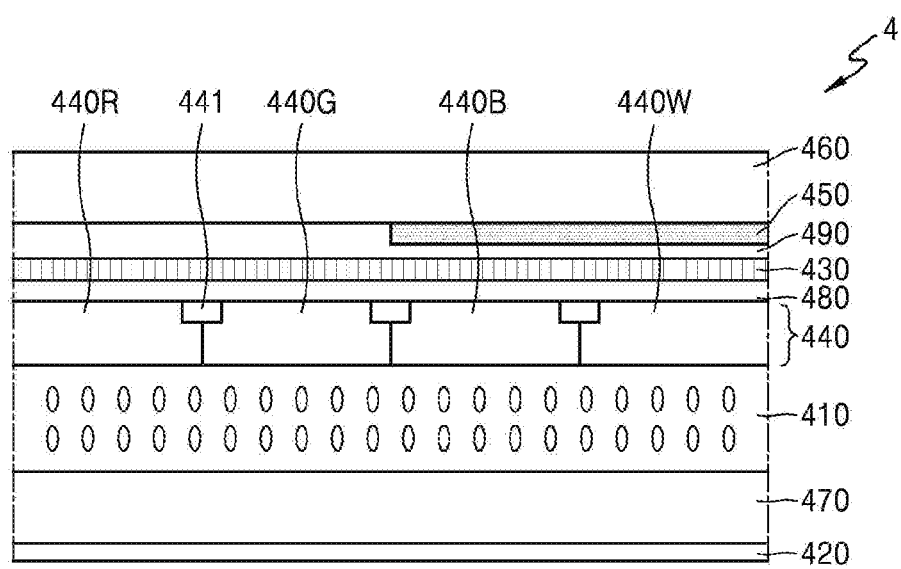
FIG. 6 is a schematic cross-sectional view of a liquid crystal display device, according to one or more exemplary embodiments.

FIG. 6 is a schematic cross-sectional view of a liquid crystal display device, according to one or more exemplary embodiments.

Referring to FIG. 6, the LCD device 4 includes an LC layer 410, a first polarizer 420 and a second polarizer 430 spaced apart from each other with the LC layer 410 disposed therebetween, a color conversion member 440 disposed between the LC layer 410 and the second polarizer 430, an emission layer 450 disposed on the second polarizer 430 to absorb at least a portion of light that passes through the color conversion member 440 and the second polarizer 430 and to emit light of a wavelength different from that of the absorbed light, and an upper substrate 460 disposed on the emission layer 450.

According to one or more exemplary embodiments, the color conversion member 440 may be disposed between the LC layer 410 and the second polarizer 430, and may convert light incident on the conversion member 440 to light of a determined color. To this end, the color conversion member 440 may include a red pixel region, a green pixel region, a blue pixel region, and a white pixel region.

The red pixel region, the green pixel region, the blue pixel region, and the white pixel region may include a red color filter 440R, a green color filter 440G, a blue color filter 440B, and a white color filter 440W, respectively. The red color filter 440R, the green color filter 440G, and the blue color filter 440B may include materials in which red, green, and blue pigment or dye are added to transparent resins, respectively. The white color filter 440W may include a material in which a light scatterer, etc., is added to a transparent resin. The LCD device 4 may include the white pixel region, so that the brightness of the LCD device 4 may be improved due to the white pixel region. A black matrix 441 for preventing (or at least reducing) color mixing may be disposed between the respective pixel regions.

The LCD device 4 may include the second polarizer 430 disposed on the color conversion member 440, and the second polarizer 430 may be a WGP. A planarization layer 480 may be disposed between the color conversion member 440 and the second polarizer 430. The LCD device 4 may include the emission layer 450 disposed on the second polarizer 430. The emission layer 450 may be patterned to correspond to the blue pixel region and the white pixel region. The emission layer 450 may include a thin film in order to transmit most, e.g., about 80% or more, of light that passes through the blue pixel region and the white pixel region of the color conversion member 440 and the second polarizer 430. For example, the emission layer 450 may have a thickness of about 0.5 μm or less.

The emission layer 450 may absorb at least a portion of light that passes through the color conversion member 440 and the second polarizer 430, and emit light of a wavelength different from that of the absorbed light. According to one or more exemplary embodiments, the emission layer 450 may emit at least blue light. Further, the emission layer 450 may include a quantum dot or a fluorescent substance. The emission layer 450 may further include blue pigment, dye and/or a scatterer in addition to a material that emits light, such as the quantum dot or the fluorescent substance. The addition of the blue pigment, the dye, and the scatterer may increase the brightness of emitted blue light.

As described with reference to FIG. 1, to allow blue light to be emitted from the emission layer 450, light of a wavelength shorter than that of the blue light should be absorbed by the emission layer 450, and, as such, mainly light that passes through the blue pixel region and the white pixel region is absorbed by the emission layer 450 so that the blue light may be emitted. In this manner, the emission layer 450 may be patterned to correspond to only the blue pixel region and the white pixel region so that a portion of light may not be lost by a portion of the emission layer 450 that corresponds to the red pixel region and the green pixel region. A transparent layer 490 may be further disposed between the second polarizer 430 and the emission layer 450 to cover the patterned emission layer 450.

As seen in FIG. 6, a lower substrate 470 facing the upper substrate 460 may be disposed below the LC layer 410, and the first polarizer 420 may be disposed below the lower substrate 470; that is, disposed on the outer surface of the lower substrate 470. The other components and configurations of the LCD device 4 of FIG. 6 that are not described herein may be the same as those of the LCD device 1 of FIG. 1.

According to one or more exemplary embodiments, an LCD device that resolves brightness reduction and a color shift that depend on a viewing angle may be provided.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
a first polarizer;
a second polarizer disposed on the first polarizer;
a liquid crystal layer disposed between the first polarizer and the second polarizer;
a color conversion member disposed between the liquid crystal layer and the second polarizer;
an emission layer disposed on the second polarizer, the emission layer configured to:
absorb at least a portion of light passed through the color conversion member and the second polarizer, and
emit light corresponding to at least a blue wavelength; and
a first substrate disposed on the emission layer.

2. The device of claim 1, wherein:
at least a portion of the emission layer satisfies $d_2 > d_1$ and $I_2 > I_1$;
$d_1$ and $d_2$ represent lengths of light paths through the emission layer; and
$I_2$ and $I_1$ represent intensities of light from the emission layer in association with the light paths of lengths $d_2$ and $d_1$, respectively.

3. The device of claim 1, wherein:
a thickness of the emission layer is about 0.5 μm or less; and
the emission layer is configured to:
transmit a portion of incident light,
absorb a portion of the incident light, and
emit light of a wavelength different from a wavelength of the incident light.

4. The device of claim 1, wherein the color conversion member comprises a red pixel region, a green pixel region, and a blue pixel region.

5. The device of claim 4, wherein thickness of the blue pixel region is greater than thicknesses of the red pixel region and the green pixel region.

6. The device of claim 4, wherein the color conversion member further comprises a white pixel region.

7. The device of claim 6, wherein the emission layer comprises a pattern corresponding to the blue pixel region and the white pixel region.

8. The device of claim 1, wherein the emission layer comprises at least one of a quantum dot and a fluorescent substance.

9. The device of claim 8, wherein the emission layer further comprises at least one of blue pigment, blue dye, and a scatterer.

10. The device of claim 1, wherein the second polarizer comprises a wire grid polarizer.

11. The device of claim 1, further comprising:
a second substrate facing the first substrate, the liquid crystal layer being disposed between the first substrate and the second substrate,
wherein the first polarizer is disposed between the second substrate and the liquid crystal layer or the second substrate is disposed between the first polarizer and the liquid crystal layer.

12. The device of claim 1, further comprising:
a backlight unit configured to emit white light towards the first polarizer.

13. A display device, comprising:
a first polarizer;
a second polarizer disposed on the first polarizer;
a liquid crystal layer disposed between the first polarizer and the second polarizer;
a color conversion member disposed between the liquid crystal layer and the first polarizer;
an emission layer disposed on the second polarizer, the emission layer configured to:
absorb at least a portion of light passed through the color conversion member and the second polarizer, and
emit light of a wavelength different from a wavelength of the absorbed light; and
a first substrate disposed on the emission layer.

14. The device of claim 13, wherein:
at least a portion of the emission layer satisfies $d_2 > d_1$ and $I_2 > I_1$;
$d_1$ and $d_2$ represent lengths of light paths through the emission layer; and
$I_2$ and $I_1$ represent intensities of light from the emission layer in association with the light paths of lengths $d_2$ and $d_1$, respectively.

15. The device of claim 13, wherein:
a thickness of the emission layer is about 0.5 μm or less; and
the emission layer is configured to:
transmit a portion of incident light,
absorb a portion of the incident light, and
emit light corresponding to at least a blue wavelength.

16. The device of claim 13, wherein the color conversion member comprises a red pixel region, a green pixel region, and a blue pixel region.

17. The device of claim 16, wherein the color conversion member further comprises a white pixel region.

18. The device of claim 13, wherein the emission layer comprises at least one of a quantum dot and a fluorescent substance.

19. The device of claim 18, wherein the emission layer further comprises at least one of blue pigment, blue dye, and a scatterer.

20. The device of claim 13, wherein the second polarizer comprises a wire grid polarizer.

* * * * *